United States Patent [19]

Weihrauch

[11] Patent Number: 6,045,649
[45] Date of Patent: Apr. 4, 2000

[54] METHOD FOR THE MANUFACTURE OF BRUSHWARE, PARTICULARLY BRUSHES

[75] Inventor: Georg Weihrauch, Wald-Michelbach, Germany

[73] Assignee: Coronet-Werke GmbH, Wald-Michelbach, Germany

[21] Appl. No.: 09/125,368

[22] PCT Filed: Feb. 20, 1997

[86] PCT No.: PCT/EP97/00825

§ 371 Date: Mar. 10, 1999

§ 102(e) Date: Mar. 10, 1999

[87] PCT Pub. No.: WO97/30611

PCT Pub. Date: Aug. 28, 1997

[30] Foreign Application Priority Data

Feb. 21, 1996 [DE] Germany .......................... 196 06 416

[51] Int. Cl.[7] .................................................. B32B 31/28
[52] U.S. Cl. .................. 156/272.8; 156/293; 156/308.2; 300/21
[58] Field of Search ................................ 156/272.8, 293, 156/308.2, 309.6; 300/21; 219/121.63, 121.64

[56] References Cited

U.S. PATENT DOCUMENTS

| 3,560,291 | 2/1971 | Foglia et al. .......................... | 156/272.8 |
| 5,893,959 | 4/1999 | Muellich .............................. | 156/272.8 |

FOREIGN PATENT DOCUMENTS

| 0124 937 | of 0000 | European Pat. Off. . |
| 0 150 785 | 8/1985 | European Pat. Off. . |
| 3637750 A1 | 5/1988 | Germany . |
| 3842 684 A1 | 7/1989 | Germany . |
| 4027108 A1 | 3/1992 | Germany . |
| 195 10 493 A1 | 10/1995 | Germany . |

OTHER PUBLICATIONS

Potente, H : Entwlcklungstendenben beim Laser–Schweissen von Kunststoffen, Plastverbieter 46, 1995, Nr. 10, pp. 58, 59, 62, 64.

Patent Abstracts of Japan, Publication No. 01277506, vol. 14, No. 43, Jan. 1990.

Patent Abstracts of Japan, Publication No. 03023807, vol. 15, No. 141, Apr. 1991.

*Primary Examiner*—Michael W. Ball
*Assistant Examiner*—Michael A Tolin
*Attorney, Agent, or Firm*—Paul Vincent

[57] ABSTRACT

In a method for the manufacture of brushware, particularly brushes, in a thermoplastic material bristle carrier are formed several blind holes, into each of which is inserted a thermoplastic material bristle coverage in the form of a single bristle or a bristle bundle, preferably accompanied by a close fit and until it rests on the bottom of the blind hole. The bristle carrier and bristle coverage are then welded together in the contact portion thereof, in that laser beams are transmitted through the bristle carrier or bristle coverage and directly applied to the contact portion and absorbed there, accompanied by the formation of heat.

8 Claims, 3 Drawing Sheets

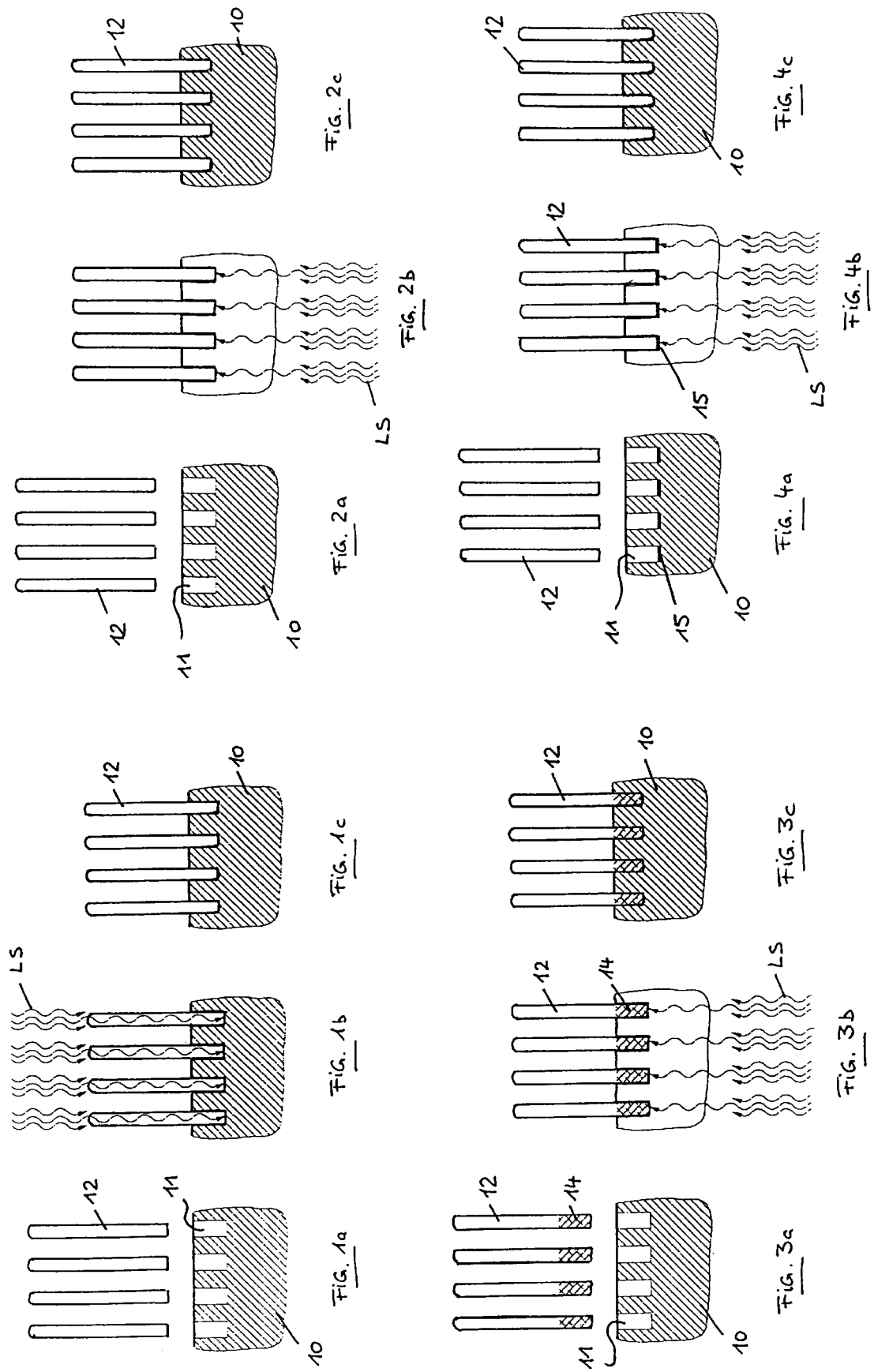

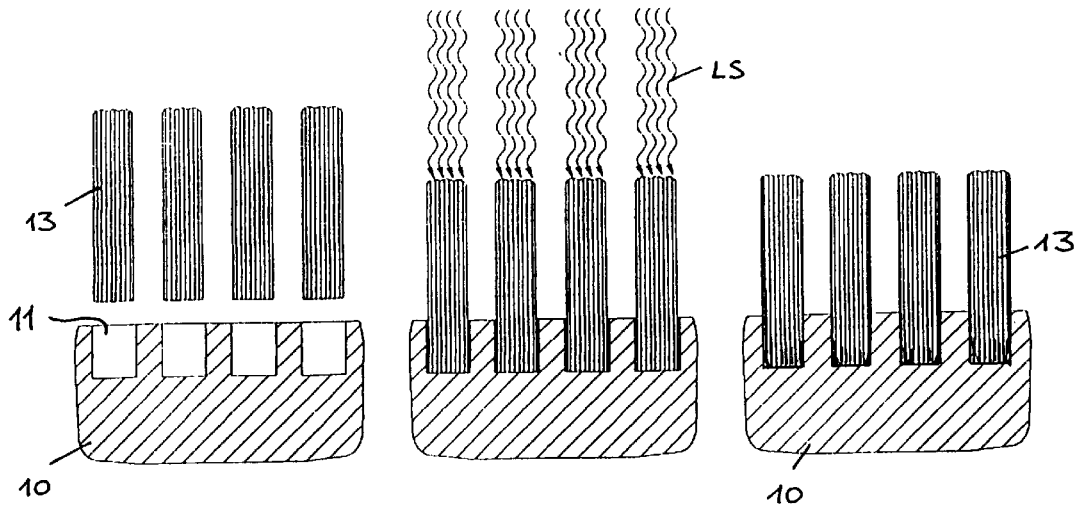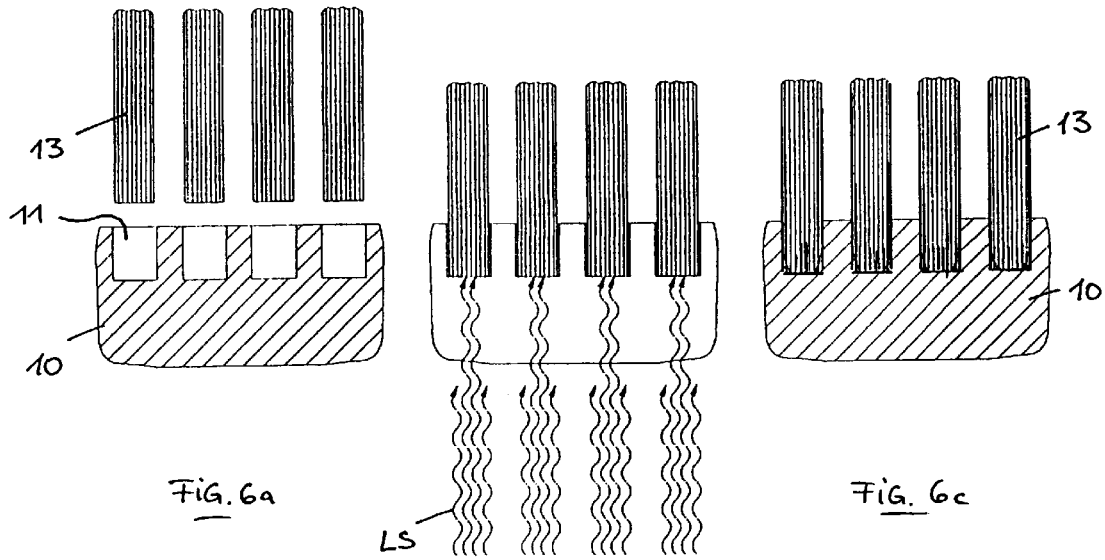

METHOD FOR THE MANUFACTURE OF BRUSHWARE, PARTICULARLY BRUSHES

BACKGROUND OF THE INVENTION

The invention relates to a method for the manufacture of brushware, particularly brushes.

In the manufacture of brushware, particularly brushes, paint brushes, mats, pads, floor coverings, etc., it is necessary to connect in one piece to a bristle carrier a plurality of single bristles or bristle bundles. The prior art discloses various methods for this purpose, but all suffer from certain disadvantages.

Since the first use of plastics both for bristles and for the bristle carrier, numerous attempts have been made to replace the earlier mechanical fastening of the bristles or bristle bundles to the bristle carrier by a positive or integral connection without any other mechanical fastening means. An important quality feature for brushware is the extraction or pull-out resistance of the individual bristles or bristle bundles, i.e. the bristles must be embedded in the plastic mass of the bristle carrier in such a way that they are not released or detached under the forces occurring during use. Of the known methods, only those have proved to be usable in which a thickened portion is provided on the bundle ends and which following the introduction into the plastic mass of the bristle carrier forms a type of anchor and also interconnects the bristles at their fastening-side end, so that the extraction forces acting on the bundle or also only on the individual bristles is introduced into the thickened portion and absorbed by the fixture thereof in the bristle carrier.

It is known from DE 36 37 750 A1 to form in the bristle carrier blind holes and to heat the plastics material surrounding the blind holes until it becomes flowable. Subsequently a unwelded or welded bristle bundle with the anchoring end is pressed into the melted blind hole, so that the bristles are held in the bristle carrier. However, it is frequently additionally necessary to have a mechanical sealing or compression of the melt in the vicinity of the hole rim. However, the particular disadvantage of this method is that the necessary heating of the bristle carrier material must take place into the thermoplastic range with very precisely chosen, relatively low heating temperatures. As a result of the slow heating, this method leads to relatively long cycle times, which is uneconomic. In the case of one-sided heating of the bristle carrier, there is a danger of the latter distorting. It is also very difficult to introduce in planned manner thermal energy into a plurality of closely adjacent blind holes, because especially with very small brushes there is a risk of the blind holes collapsing on heating. On feeding individual bristles into the blind holes, the problem arises that the low flexural strength of the single bristles is further significantly reduced when they are heated, so that during feeding there can be a lateral moving aside of the bristles.

It is also known to weld the bristles to the bristle carrier. For this purpose the bristles or bristle bundles and the bristle carrier, which are made from the same material, are heated to a thermoplastic state and then the two components are pressed onto one another. Due to the strong heating of the bristles, there is a molecular reorientation and consequently a marked deterioration of the flexural strength of the individual bristles, together with a reduction of their tensile strength. In a variant of the method, at the end of the bristles or bristle bundle can be formed slightly thickened heads. As the two components are only connected via the materials flowing together at the connection points, there is not always an adequate connection between the two components. In addition, this method also leads to relatively long cycle times. During the welding of the bristles or bristle bundles, weld feet form on the bristle carrier, so that the latter has a stepped surface, in which can collect bacteria or other impurities. This makes it much more difficult to clean the brush and is also extremely unhygienic.

It is particularly difficult to fasten single bristles with an adequate quality in the blind holes of a bristle carrier. When heating an individual or single bristle a drop forms, which exceeds the diameter of the very small blind hole, into which the single bristle is to be introduced. On inserting the single bristle, there is consequently a smearing of the plastics material, so that a reliable connection between the single bristle and the bristle carrier is not ensured. In the case of a supply of the single bristle in the heated state into the blind hole, a buckling can occur if the single bristle is compressed, so that it is not possible to achieve a correct, mutual orientation of a plurality of single bristles.

It is desirable both for the bristles, which are generally of higher grade plastics, such as polyamides, and the bristle carrier, to keep the material use as low as possible, which would be implementable by a correspondingly short fixture of the bristles. Brushware also exists, in which the bristle carrier is to have a minimum wall thickness for use reasons. This e.g. applies with toothbrushes, so that due to the constricted conditions in the oral cavity, a shallow or flat construction, including the bristle length is ensured.

The know methods also suffer from the disadvantage that the flexural strength or bending elasticity (re-righting capacity) of the bristles resulting from the stretching and thermal stabilization of the monofilaments is impaired by the melting of the bristle ends in connection with the formation of the thickened portion. In the heated area of the bristles there is a molecular reorientation and consequently a deterioration of the bending behaviour of the single bristle and a reduction of tensile strength. This can only be counteracted by an adequately large embedding length and consequently a lateral support of the bristle, but this is disadvantageous for the reasons indicated hereinbefore.

The problem of the invention is to provide a method for the manufacture of brushware, particularly brushes, in which in the case of a low material use, an adequate extraction resistance of the individual bristles and also the bundles is achieved, the bending elasticity and re-righting capacity of the bristles are maintained and which ensures a high productivity during the manufacture of the brushware.

SUMMARY OF THE INVENTION

According to the invention, this problem is solved by a method for the manufacture of brushware, particularly brushes, in which are formed in thermoplastic material bristle carrier several blind holes, into each of which is inserted a thermoplastic material bristle coverage in the form of a single bristle or a bristle bundle until the latter rests on the bottom of the blind hole and then the bristle carrier and bristle coverage are welded together in their contact portion, in that laser beams are transmitted through the bristle carrier or bristle coverage and applied directly to the contact portion and are absorbed there, accompanied by the formation of heat.

In the method according to the invention, in the bristle carrier made from thermoplastic material, is initially formed in known manner several blind holes, in each of which is introduced a thermoplastic material single bristle or a corresponding bristle bundle and this preferably takes place, accompanied by a close fit, until the underside rests on the bottom of the blind hole. At the lower end of the single bristle or bristle bundle no thickened portion or foot is formed, so that the blind holes and consequently also the single bristles or bristle bundles can be very closely juxtaposed. This makes it possible for the bristle coverage to extend close to the edge of the bristle carrier.

The components positioned relative to one another in the cold state (bristle carrier and single bristle or bristle bundle) are then directly interconnected in the contact portion thereof in the vicinity of the bottom of the blind hole by the direct action of laser beams, which are preferably applied by a $CO_2$ laser, a neodymium laser or an excimer laser. The laser beams can be transmitted or passed through one of the components, which is transparent or non-absorbing for the laser beams, directly and substantially without energy losses to the connection point between the bristles and the bristle carrier. In the contact portion the laser beams are absorbed to a significant extent, which evolves heat, which melts the thermoplastic materials, so that the bristles or bristle bundles are welded to the bristle carrier.

The molecular structure of the bristle is not destroyed, because the longitudinally oriented molecules in the bristle maintain their orientation, because they have no giving away possibility, i.e. the possibility of shrinking to a drop.

A longer pressing together of bristle and bristle carrier is unnecessary following a short laser pulse. The blind holes hold the bristles even in the unwelded state and certainly after a short welding time, so that immediately following welding a transfer to other work stations is possible.

For the purpose of absorbing the laser beams, in the contact portion of at least one of the components to be connected can be provided an at least zonal laser beam-absorbing characteristic. This can e.g. be achieved in that the entire component is made from a thermoplastic material, which absorbs the laser beams, such as homopolymers and copolymers of polypropylenes, polyethylenes, polyamides, polyesters, polyacetals, styrene polymers, sulphur polymers, polyimides, fluoropolymers, polyketones, polyether ketones or some other modified natural substance having thermoplastic characteristics meltable by the action of the laser beam and which resolidifies at the end of energy supply.

Laser beams only have a limited divergence, so that it is possible to ensure a high directional stability of the laser beam, together with a uniform energy density on the surface to be treated. In addition, laser beams have a limited spectral band width and a high spectral energy density, so that with very short cycle times a relatively high energy quantity can be applied, so that the energy action can be locally closely defined. The considerable time and space coherency of the laser beam ensures constant method conditions and a high processing precision and moulding quality. In addition, the laser beams make it possible to product very short light pulses, so that the energy can be applied in very precisely dosed manner.

As a result of said method, it is possible for the melting area to be restricted to a very small bristle length, which prevents weakening of the bristles by an orientation re-formation of the molecules and consequently a deterioration of the mechanical characteristics. It is also possible to achieve a very planned, rapid melting of spatially closely defined material areas. A plurality of bristles or bristle bundles can be simultaneously fastened in a single pass, which gives rise to very short cycle times. It has been found that with said method, on fastening bristles in a bristle carrier, high retaining and extraction forces are obtainable, accompanied by limited installation or embedding lengths.

In simple manner it is also possible to connect filled bristles, e.g. bristles with incorporated abrasives, to a laser beam-transparent bristle carrier.

The interaction between the laser beams and the material to be melted, particularly plastic, is essentially determined by the wavelength of the laser used and the absorption behaviour of the plastic. Following a corresponding laser energy absorption, it is possible for there to be a reaction on the one hand via thermal processes, such as melting and evaporation of matrix material, bleaching of organic dyes, removal or black pigments, expansion, or by photochemical processes, e.g. with photoactive white pigments in the UV range.

As a result of the high laser efficiency with high energy density per surface treated, it is possible to attain very high movement speeds during manufacture and consequently very short cycle times which, compared with the aforementioned known methods, can be up to 70% lower. It is possible, e.g. in the case of toothbrushes, to treat the entire covered surface of one or more brushes in a single pass.

It has been found that with the method according to the invention a high flexibility can be obtained, because it is easily adaptable to different geometrical shapes of the bristle carrier. It also permits the design of different wall thicknesses without increasing the manufacturing times and overall leads to a very high productivity with high production speed and high process quality, i.e. low waste rates and high, uniform quality.

Preferably, one of the components to be connected is laser beam-transparent, i.e. non-absorbing, whereas the other component, at least in the area of the connection point, is of a laser beam-absorbing, meltable material. Thus, the laser beams can be directed through the transparent component to the connection point, so as to melt there the absorbing material of the other component.

The laser beam-absorbing material can either be intrinsically of an absorbing nature, or this absorbing action can be brought about by an at least zonal introduction of fillers and/or dyes. In this way it is possible to make the two components to be connected (bristle carrier and bristle or bristle bundle) from the same base material and only one of the components acquires an absorbing action through the introduction of said materials. Thus, e.g. the same plastics materials which, as a result of an addition of different additives or fillers have differing light transmission and absorption characteristics, can be interconnected.

It is also possible to make the laser beam-transparent component, e.g. the bristle, at least in the area of the connection point, i.e. at the lower end of the bristle, absorbing by a coating and/or the introduction of fillers or dyes. The laser beams can then be directed through the transparent component onto the connection point, where they melt the portion of said component made absorbing by the indicated measures. The particular advantage of this procedure is that the other component is completely free with respect to its design and its material.

It is also possible to provide at the connection point an insert of a laser beam-absorbing material, in order to produce at the connection point the heat necessary for melting purposes. The insert can be formed by an auxiliary tool, which can subsequently be moved away, so that the melted component end can be connected to the optionally also melted, other component. It is alternatively possible to leave the insert as a lost auxiliary material at the connection point.

On fastening bristles in a bristle carrier, preferably use is made of the following material combinations. On the one hand, the bristle carrier and bristles can be made from polypropylene and then one of the components, preferably the bristle carrier, is made transparent, whereas the bristles, are dyed and consequently absorbing, e.g. through the use of $TiO_2$. On the other hand, it is possible to make the bristle carrier from SAN (thermoplastic copolymers of styrene and acrylonitrile) and the bristles of polyamide, the bristles being dyed in order to obtain the absorbing characteristics, whereas the SAN bristle carrier is made transparent. Therefore the laser beams are passed through the SAN bristle carrier and melt the bristles. In a further development, it is possible to make the bristle carrier from polypropylene and the bristles from polyamide, the bristle carrier being dyed to obtain absorbing characteristics and the bristles are made transparent. The laser beams are then applied through the bristles to the connection point and melt there the bristle carrier material.

Further details and features of the invention can be gathered from the following description of embodiments with reference to the attached drawings, wherein show:

BRIEF DESCRIPTION OF THE DRAWINGS

FIG. 1a a first individual step of a method for applying single bristles to a bristle carrier.

FIG. 1b a second individual step of the method of FIG. 1a

FIG. 1c a third individual step of the method of FIGS. 1a and 1b.

FIG. 2a a first step of a first variant of the method.

FIG. 2b a second step of the first variant of FIG. 2a.

FIG. 2c a third step of the first variant of FIGS. 2a and 2b.

FIG. 3a a first step of a second variant of the method.

FIG. 3b a second step of the second variant of FIG. 3a.

FIG. 3c a third step of the second variant of FIGS. 3a and 3b.

FIG. 4a a first step of a third variant of the method.

FIG. 4b a second step of the third variant of FIG. 4a.

FIG. 4c a third step of the third variant of FIGS. 4a and 4b.

FIG. 5a a first step of a method for applying bristle bundles to a bristle carrier.

FIG. 5b a second step of the method of FIG. 5a.

FIG. 5c a third step of the method of FIGS. 5a and 5b.

FIG. 6a a first step of a first variant of the method.

FIG. 6b a second step of the first variant of FIG. 6a.

FIG. 6c a third step of the first variant of FIGS. 6a and 6b.

FIG. 7a a first step of a second variant of the method.

FIG. 7b a second step of the second variant of FIG. 7a.

FIG. 7c a third step of the second variant of FIGS. 7a and 7b.

FIG. 8a a first step of a third variant.

FIG. 8b a second step of the third variant of FIG. 8a.

FIG. 8c a third step of the third variant of FIGS. 8a and 8b.

DESCRIPTION OF THE PREFERRED EMBODIMENT

Figures 7A, 7B, 7C:
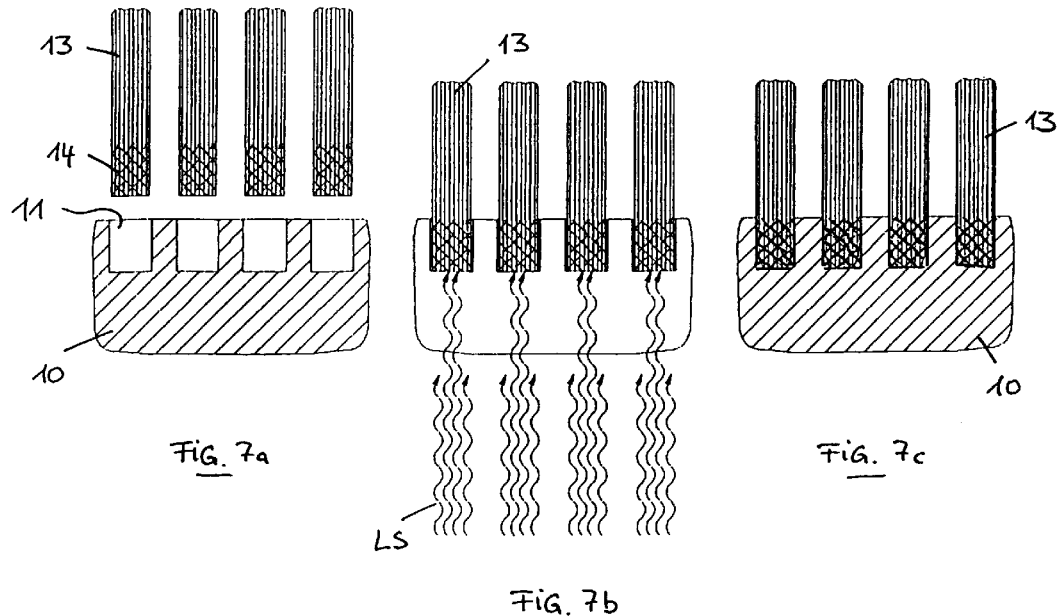
Figures 8A, 8B, 8C:
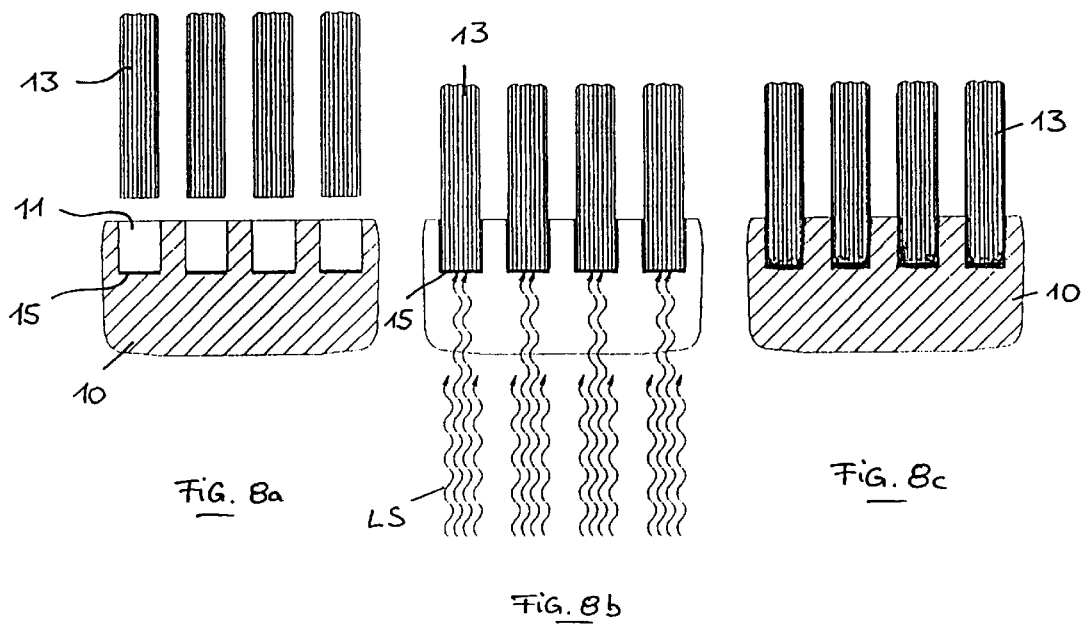

FIGS. 1a, 1b and 1c show the individual steps of the method for integrally applying several single bristles 12 to a bristle carrier 10. The bristle carrier 10 is provided with a plurality of blind holes 11, in which is in each case inserted a single bristle 12 in the unheated state. The single bristle 12 is made from a laser beam-transparent material, whereas the bristle carrier 10 is made from a laser beam-absorbing material, at least in the area of the blind hole 11. Thus, each of the single bristles 12 is inserted with a close fit in a blind hole 11, until its underside rests on the bottom of the blind hole. Then, laser beams LS are simultaneously applied through the transparent single bristles 12 to the connection point at the blind hole bottom, so that as a result of the absorption of the laser beams at said blind hole bottom heat is evolved, which melts the material of the bristle carrier 10. As a result of convection heat, the material of the single bristles 12 also melts, so that the materials flow into one another and any gap between the blind hole 11 and single bristle 12 is filled and the lower end of the single bristles 12 is embedded in full surface manner in the bristle carrier 10 and welded thereto.

The embodiment according to FIGS. 2a, 2b and 2c differs from the aforementioned embodiment in that now the material of the bristle carrier 10 is transparent to laser beams, whereas the bristles, at least at their lower end, can absorb the laser beams. After inserting the single bristles 12 in the blind holes 11 of the bristle carrier 10, laser beams are applied through the bristle carrier 10 to the connection point at the bottom of the blind hole, so that the single bristles 12 are welded in the described manner to the bristle carrier 11.

The variant of FIGS. 3a, 3b and 3c with respect to the embodiment of FIGS. 2a, 2b and 2c consists of the lower portion of the single bristles 12 to be inserted in the blind hole 11 being provided with filler and dye particles 14, which can absorb the laser beams LS, so that the upper portion of the single bristles 12, not to be inserted in the blind hole 11, can also be made from a laser beam-transparent material.

FIGS. 4a, 4b and 4c show an embodiment in which both the single bristles 12 and the bristle carrier 10 are made from a laser beam-transparent material, so that prior to the introduction of the single bristles 12 in the blind holes 11, an insert 15, which absorbs the laser beams, is provided on the bottom of the blind hole. After the single bristles 12 have been introduced into the blind holes 11 until they rest on the blind hole bottom or insert 15, laser beams are applied through the single bristles 12 or, as shown, through the bristle carrier 10 to the connection point, where they are absorbed by the insert 15. As a result of the convection heat, both the bristle carrier 10 and the single bristles 12, melt in their contact area and form an integral connection.

What has been explained in the four above embodiments with respect to single bristles, can be performed in the same way with bristle bundles 13, which are introduced as a loose pack and in close fitting manner into in each case one blind hole 11. When laser beams are supplied the single bristles of the bristle bundle 13 are on the one hand interconnected and on the other welded to the bristle carrier 10. The further features coincide with the method for the application of single bristles, to which reference is hereby made.

I claim:

1. A method for the manufacture of brushware and brushes comprising the steps of:
    a) forming a plurality of blind holes in a thermoplastic material bristle carrier;
    b) inserting a thermoplastic material bristle coverage in a form of one of single bristles and bristle bundles into said blind holes to rest on bottoms of said blind holes;
    c) transmitting laser beams through at least one of said bristle coverage and said bristle carrier; and
    d) absorbing light from said laser beams at a contact location between said bristle coverage and said bristle carrier to generate heat for welding together said bristle carrier and said bristle coverage at said contact location.

2. The method of claim 1, wherein steps a) and b) comprise forming and inserting to generate a close fit between said bristle carrier and said bristle coverage.

3. The method of claim 1, wherein at least one of said bristle coverage and said bristle carrier comprises laser beam absorbing material at said contact location.

4. The method of claim 1, wherein at least one of said bristle coverage and said bristle carrier comprises at least one of laser beam absorbing fillers and laser beam absorbing dyes at said contact location.

5. The method of claim 1, further comprising the step of:
   a1) inserting a laser beam absorbing insert into said blind holes near said bottoms thereof.

6. The method of claim 1, wherein step d) comprises simultaneously welding together said bristle coverage and said bristle carrier.

7. The method of claim 1, wherein step a) comprises using laser beams to form said blind holes.

8. The method of claim 1, wherein said laser beams are generated by one of a $CO_2$ laser, a neodymium laser, and an excimer laser.

* * * * *